Figure 1:
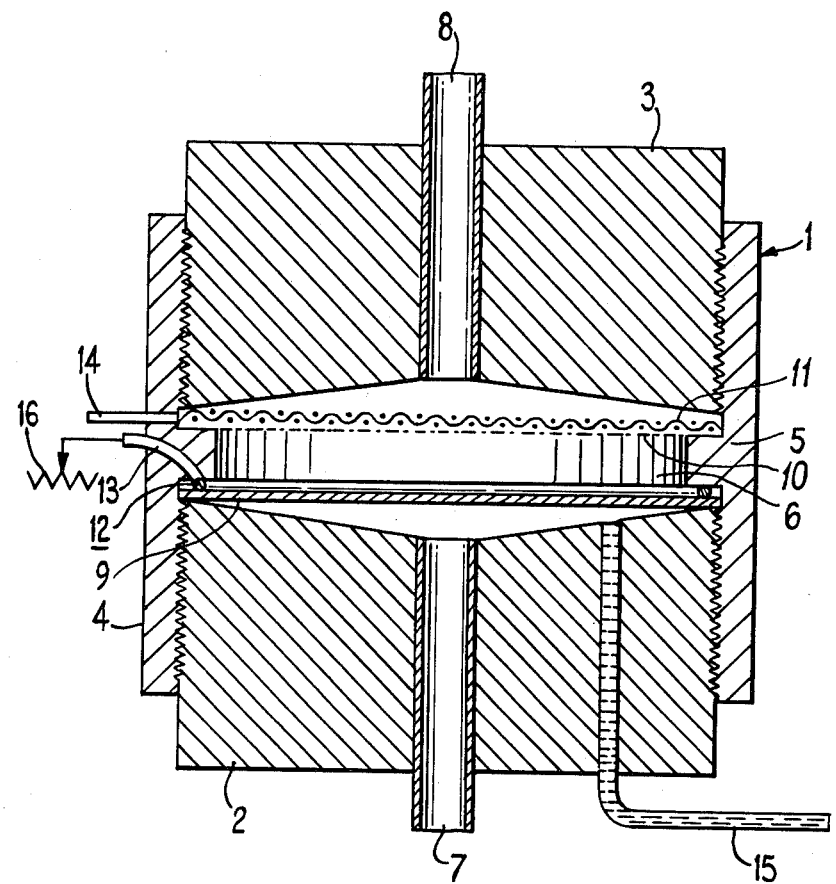

United States Patent [19]

Fairhurst

[11] 4,400,250

[45] Aug. 23, 1983

[54] ADSORPTION ONTO CHARCOAL CLOTH

[75] Inventor: David Fairhurst, Tarrytown, N.Y.

[73] Assignee: The Secretary of State for Defence in Her Britannic Majesty's Government of the United Kingdom of Great Britain and Northern Ireland, London, England

[21] Appl. No.: 285,521

[22] Filed: Jul. 21, 1981

[30] Foreign Application Priority Data

Jul. 24, 1980 [GB] United Kingdom ............... 8024280

[51] Int. Cl.$^3$ ...................... B01D 57/02; B01D 13/02
[52] U.S. Cl. ............................ 204/180 R; 204/151; 204/186; 204/301
[58] Field of Search .................. 204/149, 191, 180 R, 204/186, 305, 301

[56] References Cited

U.S. PATENT DOCUMENTS

| | | | |
|---|---|---|---|
| 3,849,332 | 11/1974 | Bailey | 252/422 |
| 3,923,629 | 12/1975 | Shaffer | 204/301 |
| 4,130,473 | 12/1978 | Eddleman | 204/151 |
| 4,248,686 | 2/1981 | Gidaspow | 204/186 |
| 4,318,789 | 3/1982 | Marcantonio | 204/151 |

*Primary Examiner*—John F. Niebling
*Attorney, Agent, or Firm*—Cushman, Darby & Cushman

[57] ABSTRACT

An apparatus for adsorbing at least one dissolved or suspended constituent from an ionically conducting medium which comprises a cell chamber, fluid inlet and outlet pipes leading into and out of the chamber and, positioned consecutively across the chamber, a charcoal cloth working electrode, a porous plastic, preferably nylon, diaphragm and a graphite or platinum counter electrode. The charcoal cloth working electrode is in intimate electrical contact with a metal wire or gauze and by varying the potential of the wire or gauze with a potentiostat the potential applied to the working electrode can also be varied, preferably by increments of above 0.01 v. Current is supplied to the working electrode by the counter electrode. The porous diaphragm allows the passage of ions from the counter to the working electrode but prevents the passage of particles of charcoal cloth from one electrode to the other.

In use an ionically conducting medium containing at least one dissolved or suspended constituent is brought into contact with the charcoal cloth working electrode. By applying an electric potential to the cloth with respect to the medium at least one of the dissolved or suspended constituents is adsorbed on to the cloth. The charcoal cloth working electrode is between 20 and 60 times more efficient than an equivalent graphite electrode.

The apparatus and method is useful in the recovery of chemicals from industrial effluent and in the separation of chemical mixtures.

12 Claims, 5 Drawing Figures

ADSORPTION ONTO CHARCOAL CLOTH

This invention relates to a method and apparatus for isolating dissolved or suspended constituents from ionically conducting media.

It is known to separate constituents from solution or suspension by electroadsorption onto a suitable adsorbent material such as silver granules, graphite granules or cloth, or chemically modified active carbon granules. The use of this technique has been suggested for the removal and recycling of chemicals from industrial effluent, and for the micro-analysis of chemical mixtures.

The advantages of such potential controlled adsorption are
(1) Efficient adsorption from dilute solution,
(2) Selective adsorption of components from mixtures by accurate potential control,
(3) Rapid reversibility. Thus, simply by reversing the potential between the working electrode and the solution, the adsorbed constituent can be desorbed, often selectively, from the electrode back into the solution.

Such electroadsorption depends on the electrical conductivity of the adsorbing electrode material and, whilst conductivity and external surface area have been considered, the inherent adsorptive capacity (ie internal surface area) of the electrode material has generally been ignored. Clearly the adsorbing electrode material must also be chemically inert under the working chemical and electrical conditions.

The materials most commonly used as the working electrode in electro-adsorption cells have been silver granules and graphite. This latter has been used in the form of a cloth for the controlled potential electrodeposition and stripping of copper, cadmium and mercury, D Yaniv and M Ariel, *J Electroanal. Chem.*, 1977, 79, 159. However, in this form, although the cloth is electrically conductive and stable during the deposition process, it has a rather low surface to volume ratio and consequently a low adsorptive capacity.

To provide a larger available surface area for more efficient solution contact (to enhance the adsorption process) and to keep current densities low (and so to avoid polarisation of the working electrode) graphite must be used in granular or powder form. The use of such forms of graphite necessitate the use of either a "packed bed" type of working electrode (J H Strohl and K L Dunlap, *Anal. Chem.* 1972, 44, 2166), or a suspension of carbon particles in the ionically conducting solution (U.K. Pat. No. 1,367,318, Battelle Memorial Institute).

Although the latter refers to "active carbon" as the adsorbent, it is used purely for its electrical properties. Since highly active carbons are generally poor conductors of electricity it is clear that merely small particle size is called for.

Even when such columns of graphite are used as the working electrode the adsorptive capacity of the cell remains rather low. For example, in the packed graphite electrochemical cell of Strohl and Dunlap between 0.16 and 5.0 mmoles of substituted quinones were adsorbed per kilogram of graphite. Whereas in an electrochemical cell according to U.K. Pat. No. 1,367,318 about 35 grams (583 mmoles) of urea were adsorbed per kilogram of graphite. Moreover electrical contact between the particles is poor and erratic leading to poor potential control and decreased selectivity.

The main object of the present invention is to provide a method and apparatus for the potential controlled adsorption and desorption of one or more constituents from a solution or suspension, with high capacity and selectivity.

According to the present invention there is provided a method of adsorbing at least one dissolved or suspended contituent from an ionically conducting medium which comprises bringing the medium into contact with a charcoal cloth working electrode and applying an electric potential to the cloth with respect to the medium so that at least one of the dissolved or suspended constituents is adsorbed on the cloth.

Optionally the ionically conducting medium may then be removed and the charcoal cloth working electrode may subsequently be contacted with an ionically conducting solvent or solution whilst applying a potential to the cloth, with respect to the medium, so that at least one of the constituents adsorbed on the cloth is released into the solventor solution.

By the term "charcoal cloth" as used herein is meant a woven or non-woven cloth primarily composed of fibrous or filamental activated carbon and having a surface area, as measured by nitrogen adsorption by the method of Brunnauer/Emmett/Teller (BET/$N_2$), of above 600 $m^2gm^{-1}$, most preferably of about 1200 $m^2gm^{-1}$. Such cloths are generally prepared by carbonisation (charring) of a cloth composed of organic fibres followed by activation, but may in some cases be prepared from precarbonised fibres. Preferably the cloth is of the type manufactured to U.K. Pat. No. 1,301,101 and U.S. Pat. No. 3,849,332.

The electrical conductivity of such charcoal cloth is preferably between about 5 and 40 ohms per square, especially between about 12 and 13 ohms per square (12–13 ohms per square is equivalent to an *absolute* conductivity of about 0.1 ohms for a cm cube) and such conductivities have been found suitable in the process of the invention.

The present invention is based on the realisation that electro-adsorption may influence not only adsorption onto the outer surface, as with graphite, but also migration into the pores of substrates such as active charcoal. Thus, applying a suitable electrical potential to charcoal cloth improves both dynamic ad equilibrium adsorption compared with cloth and granular charcoal at zero potential. The application of such a suitable potential also improves the rate at which adsorption takes place onto charcoal cloth compared with the rate of adsorption onto either cloth or granular charcoal at zero potential.

A further object of this invention is to provide a method and apparatus for the potential controlled separation of two or more constituents dissolved or suspended in an ionically conducting medium, with high capacity and selectivity.

Thus the present invention provides a method of separating two or more constituents dissolved or suspended in an ionically conducting medium which comprises bringing the medium into contact with a charcoal cloth working electrode and applying an electric potential to the cloth with respect to the medium so that at least one of the dissolved or suspended constituents is adsorbed on the cloth; and optionally removing the medium containing at least one other dissolved or suspended constituent, contacting the charcoal cloth working electrode with an ionically conducting solvent or solution, and applying an electric potential to the cloth with respect to the solvent or solution so that at least one of the constituents adsorbed on the cloth is released into the solvent or solution.

When the constituents to be adsorbed onto the charcoal cloth working electrode of this invention, are dissolved or suspended in aqueous solution the potential difference between the charcoal cloth working electrode and the surrounding ionic solution should be kept below about 1.5 v. Above this potential difference water is electrolysed, and this would lead not only to the production of explosive gases in the cell but also to the polarisation of the working electrode.

However when the constituents are dissolved or suspended in non-aqueous solvents, such as alcoholic or polar, aprotic solvents, then potential differences of up to 3 v, between the working electrode and the solution, may be employed.

Although when the constituent to be adsorbed is strongly polarised (or ionised) the electroadsorption process can proceed in the absence of a supporting electrolyte it is generally preferred to conduct the process in the presence of a dissolved supporting electrolyte, such as for example sodium chloride or potassium chloride. The advantage of including such a supporting electrolyte in the solution is that it keeps the ionic strength of the solution high so that the current obtained in the cell is not conductivity limited and the total ionic strength of the solution remains effectively constant during the electroadsorption process.

The invention further provides an apparatus for adsorbing at least one dissolved or suspended constituent from an ionically conducting medium or for separating two or more constituents dissolved or suspended in an ionically conducting medium which apparatus comprises a cell chamber, fluid inlet and outlet pipes leading into and out of the chamber and, positioned consecutively across the chamber, a charcoal cloth working electrode, a porous diaphragm and a counter electrode.

Potential may be applied to the working electrode by any suitable means, preferably however the charcoal cloth working electrode is in electrical contact with a metal wire or gauze. This is preferably achieved by clamping or soldering the wire or gauze to the cloth, especially after spray coating the cloth with metal as described in U.K. Pat. No. 1,552,924. By varying the potential applied to said wire or gauze, by means of a potentiostat, the potential applied to said working electrode, with respect to the ionically conducting medium, can also be varied.

Preferably the wire or gauze is in such intimate contact with the charcoal cloth working electrode that the potential applied to said working electrode (with respect to the solution) can be increased or decreased by increments of about 0.01 v. The required intimacy of contact may be achieved by pressing the wire or gauze firmly into the cloth. Since the optimum adsorption potentials of, for example, two constituents in a mixture may differ by only a small voltage such fine control of the potential difference in the preferred apparatus of this invention may allow at least the partial separation of a mixture which would otherwise be inseparable. The use of coherent conducting cloth greatly assists this fine control.

Current is supplied to the working electrode by means of the counter electrode which may comprise any suitable inert, electrically conducting material. In preferred embodiments of the apparatus of this invention the counter electrode comprises graphite or platinum.

The diaphragm, or porous partition, comprises any material that allows the passage of ions in the solution from the counter to the working electrode (or vice versa) whilst preventing the passage of the particles of the charcoal cloth from one electrode to the other. In a preferred embodiment of this invention the diaphragm comprises a plastic (eg nylon)frit.

The adsorptive capacity of charcoal cloth with an appropriate potential applied is generally substantially higher than the corresponding capacity of graphite or granular charcoal. For example the equilibrium adsorption of phenol onto charcoal cloth at a potential of +1.0 V is more than 4 times the equilibrium adsorption of phenol onto granular charcoal at zero potential.

The rate of adsorption onto charcoal cloth with an appropriate potential applied is also generally substantially higher than the corresponding rate of adsorption onto graphite, or granular charcoal. Thus the rate constant for the adsorption of phenol onto charcoal cloth at a potential of +1.0 V is more than 100 times the rate constant for the adsorption of phenol onto granular charcoal at zero potential. This large increase in the rate of adsorption may be of particular benefit in the large scale industrial uses of the method and apparatus of this invention.

Figure 2:
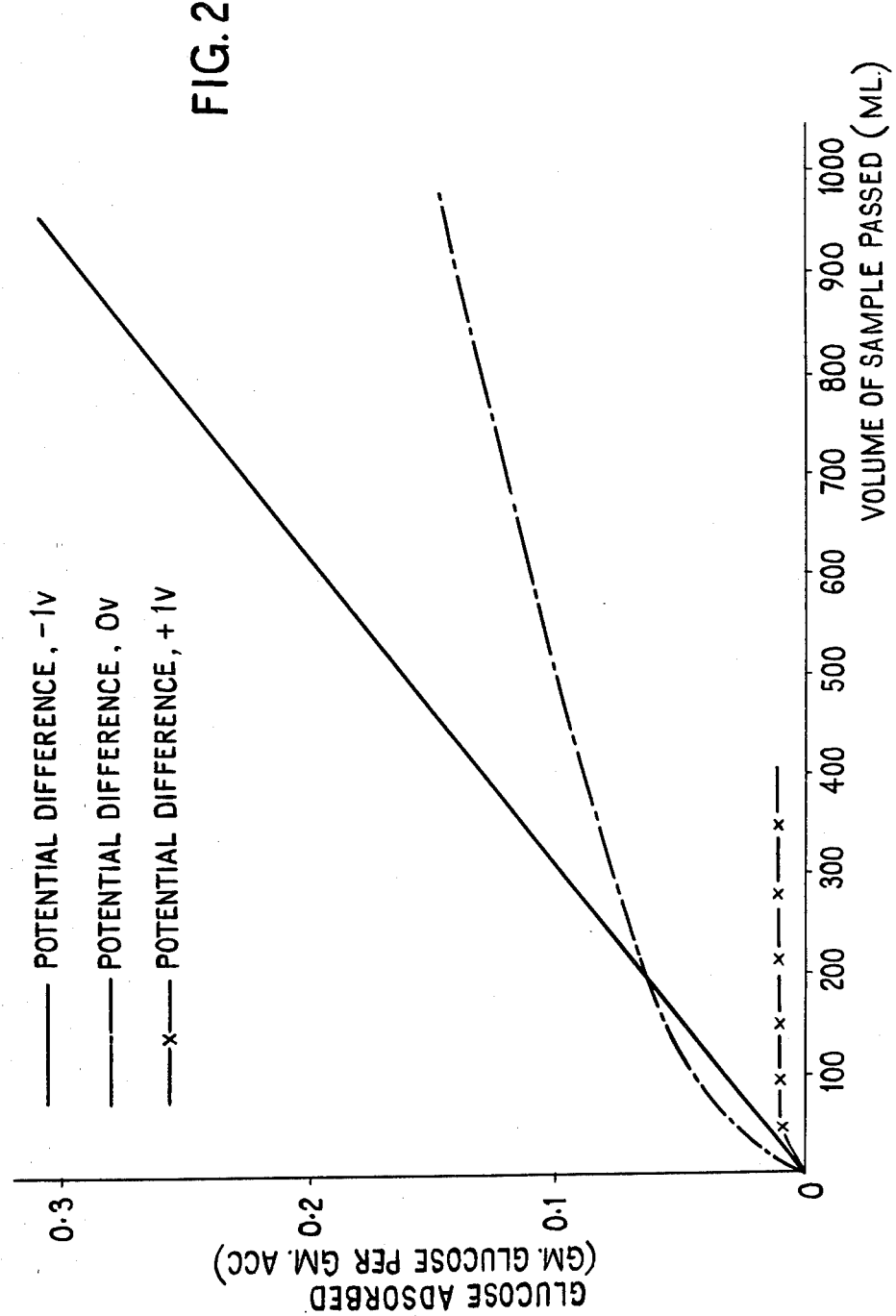
Figure 3:
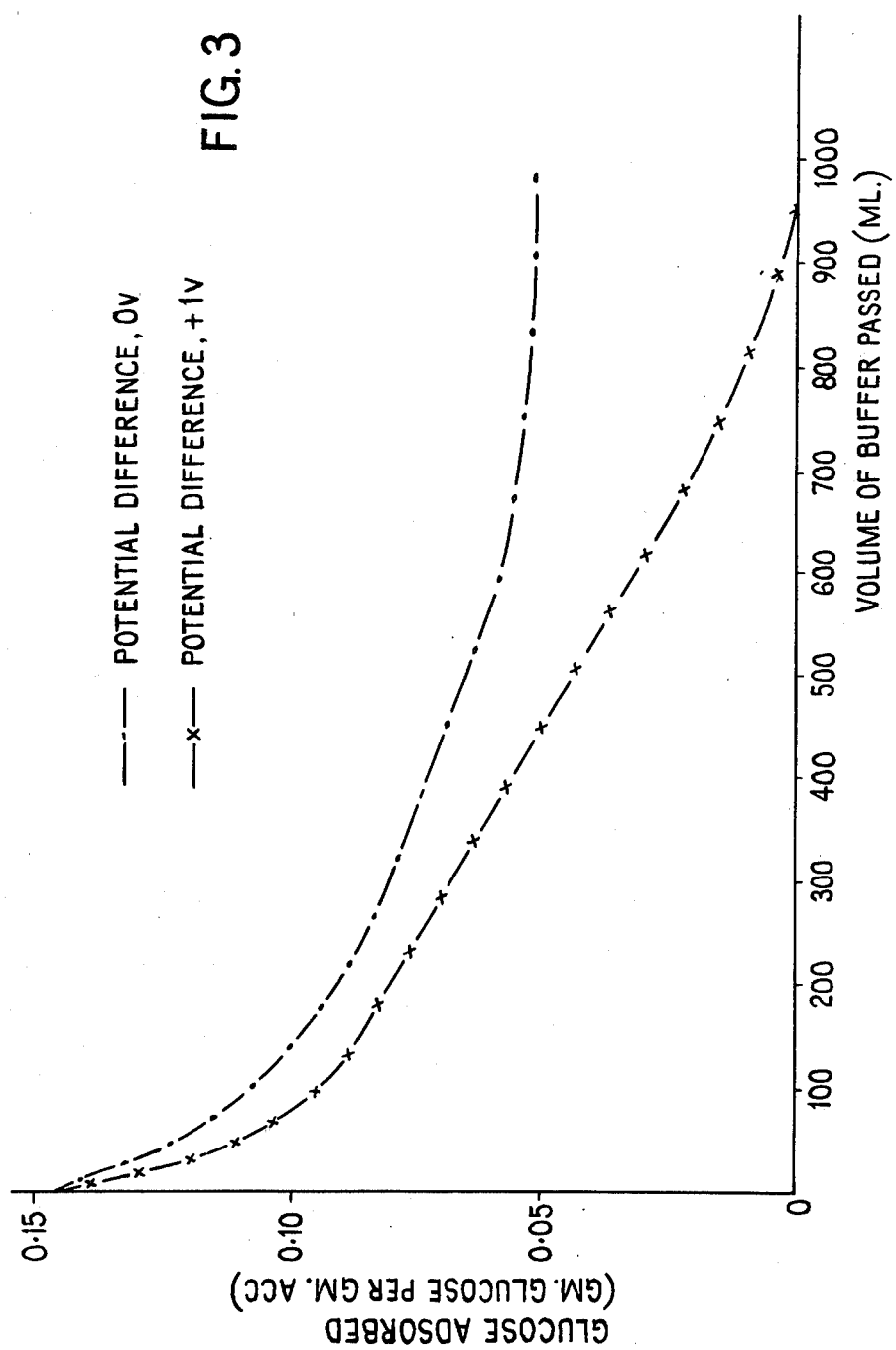
Figure 4:
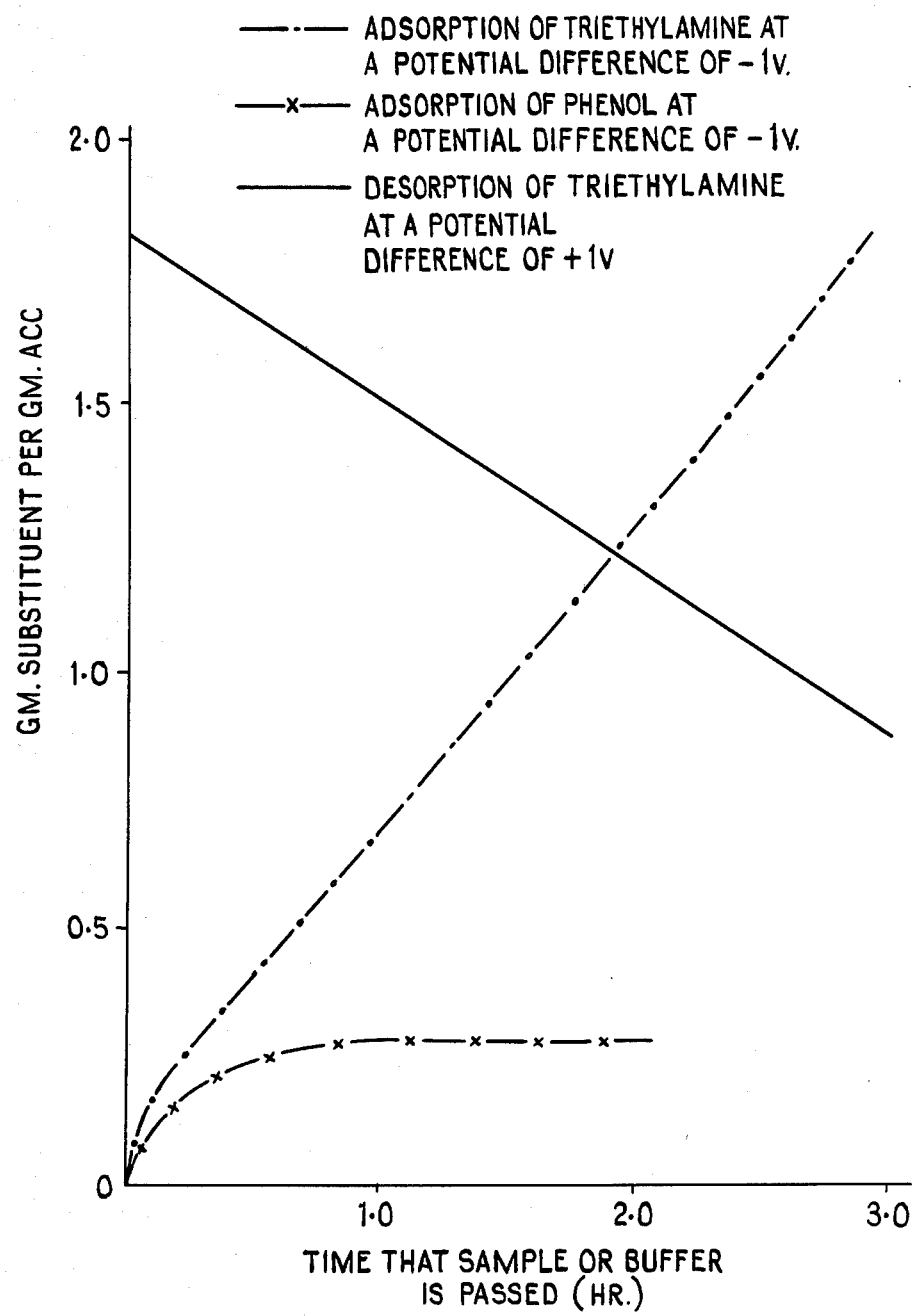
Figure 5:
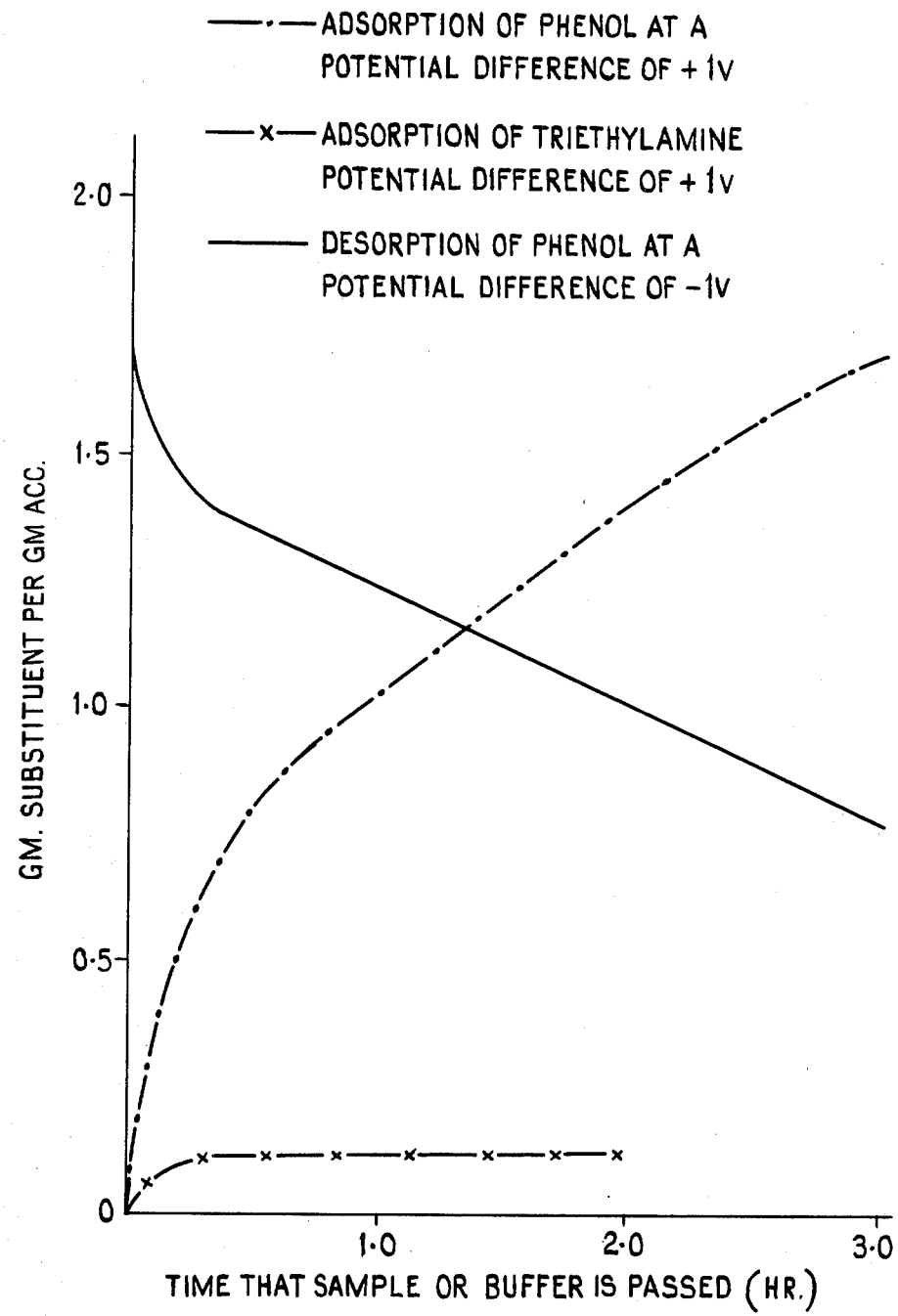

One embodiment of the apparatus and typical processes of the present invention will now be described by way of Example only with particular reference to the accompanying drawings in which, FIG. 1 shows a sectional view of the electrochemical cell, FIG. 2 is a graphical representation of the adsorption of glucose onto activated charcoal cloth (ACC) in a cell of this invention under conditions of potential control, FIG. 3 is a graphical representation of the desorption of glucose from ACC charged at a potential difference of OV under conditions of potential control, FIG. 4 is a graphical representation of the adsorption of a triethylamine/phenol mixture onto ACC with the ACC electrode as the cathode, and the desorption of the adsorbed triethylamine from the ACC with the ACC electrode as the anode, and FIG. 5 is a graphical representation of the adsorption of a triethylamine/phenol mixture onto ACC with the ACC electrode as the anode, and the desorption of the adsorbed phenol from the ACC with the ACC electrode as the cathode.

Referring to FIG. 1 an all-polytetrafluoroethylene case 1 of the electrochemical cell consists of externally threaded cylindrical lower 2 and upper 3 units engaging an internally threaded linking collar 4. The adjacent inner faces of the lower 2 and upper 3 units, have conical depressions and are separated by an inwardly projecting ring 5 formed around the inner surface of the linking collar 4 to form a cell chamber 6. The lower 2 and upper 3 units have respectively an inlet 7 and an outlet 8 leading into and out of the cell chamber 6.

Positioned consecutively across the cell chamber 6 are a charcoal cloth working electrode 9, a porous nylon diaphragm 10 and a platinum gauze counter electrode 11. The charcoal cloth working electrode 9 is held by the lower unit 2 in electrical contact with a loop of platinum wire 12 around the lower surface of the inwardly projecting ring 5 on the linking collar 4. This loop is in turn connected to a potentiostat 16 by platinum wire 13. Similarly the diaphragm 10 and counter electrode 11 are clamped between the upper unit 3 and the upper surface of the inwardly projecting ring 5, the counter electrode being in electrical contact with a platinum wire 14.

A saturated (KCl) agar gel liquid junction 15 passes through the lower unit 2 and connects the working electrode 9 to a calomel reference electrode (not shown).

In alternative embodiments of the cell of this invention electrical contact may be made with the charcoal cloth by means of a ring of copper wire, optionally soldered to the cloth, or a graphite disc, whilst the counter electrode may be in either coil or helical form.

In use a liquid medium containing one or more components is pumped through the inlet 7 and into the cell chamber 6. It then passes through the charcoal cloth working electrode 9, the porous nylon diaphragm 10 and the platinum gauze counter electrode 11 and finally leaves the chamber 6 through outlet 8. During the passage of the medium through the chamber 6, the charcoal cloth working electrode 9 is kept at a known potential with respect to the medium by means of a potentiostat 16 which controls the potential of the ring of platinum wire 12 and thereby of the working electrode 9 and current between the working electrode 9 and the platinum counter electrode 11. By choosing an appropriate potential difference between the working electrode 9 and the medium at least one of the components of the medium is adsorbed onto the charcoal cloth electrode 9.

Once the medium has been passed through the cell chamber 6 the adsorbed component may be collected by passing an ionically conducting buffer solution through the chamber 6 with the polarity of the electrodes 9 and 11 reversed. The desorbed component may be isolated from the collected buffer solution by any suitable isolation process.

EXAMPLE 1

A. Purification of the activated charcoal cloth

The charcoal cloth was freed from impurities as follows:

500 ml of 1 M hydrochloric acid was placed in a 1 liter flask with a piece of activated charcoal cloth prepared by the process of U.K. Pat. No. 1,301,101 and U.S. Pat. No. 3,849,332. The flask and contents were boiled under reflux for 1 hour and stirred intermittently.

After cooling the solution the acid was decanted and the cloth was transferred to a 1 liter beaker, where all the free acid was removed by washing the cloth with two 300 ml portions of distilled water. The cloth was then:

(i) placed in a Soxhlet apparatus and water extracted for 50 hours, the water being changed regularly,
(ii) transferred to a vacuum oven and heated at 110° C. under reduced pressure for 2 hours,
(iii) heated at 350° C. for 2 hours in a stream of $N_2$,
(iv) cooled in a dessicator under vacuum,
(v) placed in a Soxhlet apparatus and ethanol extracted for 4 hours, the ethanol being changed regularly,
(vi) repeat steps (i) to (iv),
(vii) placed in a Soxhlet apparatus and carbon tetrachloride extracted for 4 hours, the carbon tetrachloride being changed regularly,
(viii) repeat steps (ii) to (iv).

The cloth was stored, prior to use in a dessicator over silica gel and under vacuum.

B. Analysis of effluent solutions (i) For phenol
The presence of phenol in the effluent solution was determined spectrophotometrically at a wavelength of 270.5 nm.

(iii) For glucose (colorimetric)
A 1 ml sample of glucose-containing solution was added to 1 ml of 1 M sodium hydroxide. 0.2 ml of 0.5% 2, 3, 5-triphenyltetrazolium chloride was then added and the mixture allowed to stand for 30 minutes. 1 ml of a pyridine solution containing 15 ml of conc. hydrochloric acid in 100 ml of pyridine, was then added to the reaction mixture, and the adsorption of the resultant solution was measured against a reagent blank, at 490 nm.

(iii) For triethylamine
The concentration of triethylamine was determined by conductimetric or potentiometric titration of the solution against 0.1 M hydrochloric acid.

C. Adsorption procedure

A solution of glucose (concentration 0.01 mol. $dm^{-3}$) in a 0.01 mol $dm^{-3}$ aqueous solution of sodium chloride was de-aerated with nitrogen and then pumped through the electrochemical cell of FIG. 1 at a rate of 5.3 ml $min^{-1}$. The charcoal cloth working electrode, treated as outlined above, had a potential, with respect to the solution, of +1 v and was maintained at this value by a potentiostat.

The effluent solution was collected in 5 ml samples by a fraction collector controlled by a cyclic timer delay relay. The fractions were analysed for concentration of glucose by the spectrophotometric method outlined above.

This process was repeated using fresh charcoal cloth electrodes, at potentials of 0 v and −1 v. The adsorption of glucose onto ACC under these three potential differences is given in graphical form in FIG. 2.

D. Desorption procedure

After the adsorption isotherm onto ACC at 0 v had been measured, an aqueous solution of sodium chloride (concentration 0.01 mol $dm^{-3}$) was pumped through the cell with the charcoal cloth electrode retained at +1 v. The effluent was collected and analysed for glucose as above.

This desorption process was repeated at a desorption potential difference of 0 v. The desorption of glucose from ACC under these two potential differences is given in graphical form in FIG. 3.

EXAMPLE 2

An aqueous solution of sodium chloride (0.01 mol $dm^{-3}$), triethylamine (0.01 mol $dm^{-3}$) and phenol (0.01 mol $dm^{-3}$) was deaerated with nitrogen and pumped through the cell of FIG. 1 with the charcoal cloth electrode at a potential, with respect to the solution of −1 v. The effluent solution was collected and analysed for triethylamine and phenol as outlined above.

The adsorption of triethylamine and phenol under these conditions is given in graphical form in FIG. 4.

The adsorbed triethylamine was desorbed by reversing the potential as in Example 1 and the desorption is shown in FIG. 4.

EXAMPLE 3

The procedure described in Example 2 was carried out except that the potential difference between the charcoal cloth electrode and the solution was +1 v. The adsorption of triethylamine and phenol under these conditions is given in graphical form in FIG. 5.

The adsorbed phenol was desorbed by reversing the potential and results are shown in FIG. 5.

EXAMPLE 4

A solution of phenol (concentration 0.01 mol dm$^{-3}$) in a 0.01 mol dm$^{-3}$ aqueous solution of sodium chloride was deaerated with nitrogen and then pumped into the electrochemical cell of FIG. 1 with the outlet closed. When the cell was full of phenolic solution the inlet was also closed.

The solution was then agitated for 18 hours, with the charcoal cloth working electrode, treated as outlined in Example 1, retained at a potential, with respect to the solution, of +1 v by a potentiostat. After this time the phenolic solution was removed from the cell and analysed, as outlined in Example 1, for concentration of phenol. From the difference between initial and final phenol concentrations the adsorption of phenol onto charcoal cloth under equilibrium conditions could be obtained. The result is given in Table I.

EXAMPLE 5

A solution of phenol (0.01 mol dm$^{-3}$) in a 0.01 mol dm$^{-3}$ aqueous solution of sodium chloride was deaerated with nitrogen and then pumped through the electrochemical cell of this invention at a rate of 5.3 ml min$^{-1}$. The charcoal cloth working electrode, treated as outlined in Example 1, had a potential, with respect to the solution of +1 v and was maintained at this value by a potentiostat.

The effluent solution was collected in 5 ml samples by a fraction collector controlled by a cyclic timer delay relay. The fractions were analysed for concentration of phenol by the spectrophotometric method outlined in Example 1.

The results obtained were used to give the rate constant, k, of the process. k, which was calculated assuming a first order rate process, is given in Table I.

EXAMPLES 6 AND 7

The processes of Examples 4 and 5 were carried out except that the charcoal cloth working electrode (from a separate batch of cloth) was retained at zero potential. The equilibrium adsorption of phenol onto activated charcoal cloth and rate constant k under these conditions are given in Table I.

Table I shows the above results compared with results for a highly active granular charcoal as reported by F A P Maggs and M E Smith at the Shirley Institute Conference on Fibrous Materials for the Filtration of Liquids (1975).

TABLE I

| | Surface Area (m$^2$ gm$^{-1}$) BET/N$_2$ | Equilibrium Adsorption (mg gm$^{-1}$) | K (min$^{-1}$) |
|---|---|---|---|
| Granular Charcoal | 800 | 500 | 0.1 |
| Activated Charcoal Cloth at 0v | 1000 | 700 | 1.5 |
| Activated Charcoal Cloth at +1v | 1200 | more than 2000 | more than 10 |

What I claim is:

1. A method of adsorbing at least one constituent from an ionically conducting medium which comprises:
   a. bringing the medium into contact with a working electrode consisting essentially of charcoal cloth composed of activated fibrous or filamental carbon having a surface area as measured by nitrogen adsorption by the method of Brunnauer/Emmett-/Teller, of above 600 m$^2$ gm$^{-1}$; and
   b. applying a d.c. electric potential to the working electrode with respect to the medium, so that at least one of the constituents is adsorbed on the working electrode.

2. A method according to claim 1 wherein the ionically conducting medium is an aqueous medium and the potential difference between the working electrode and the medium is less than 1.5 volts.

3. A method according to claim 1 wherein the ionically conducting medium is a non-aqueous medium and the potential difference between the working electrode and the medium is less than 3 volts.

4. A method according to claim 1 wherein the ionically conducting medium contains a supporting electrolyte.

5. A method of separating at least two constituents in a first ionically conducting medium which comprises:
   a. bringing the medium into contact with a working electrode consisting essentially of charcoal cloth composed of activated fibrous or filamental carbon having a surface area, as measured by nitrogen adsorption by the method of Brunnauer/Emmett-/Teller, of above 600 m$^2$ gm$^{-1}$;
   b. applying a d.c. electric potential to the working electrode, with respect to the medium, so that at least one of the constituents is adsorbed on the working electrode;
   c. removing the first ionically conducting medium;
   d. contacting the working electrode with a second ionically conducting medium; and
   e. applying an electric potential to the working electrode with respect to the second medium, so that at least one of the constituents adsorbed on the cloth is released into the medium.

6. A method according to claim 5 wherein the first and second ionically conducting media are aqueous media and the potential difference between the working electrode and the media is less than 1.5 volts.

7. A method according to claim 5 wherein the first and second ionically conducting media are non-aqueous media and the potential difference between the working electrode and the media is less than 3 volts.

8. A method according to claim 5 wherein the first and second ionically conducting media contain a supporting electrolyte.

9. An apparatus for adsorbing at least one constituent from an ionically conducting medium and for separating at least two constituents in an ionically conducting medium which comprises:
   a. an electrochemical cell, having a cell chamber, a fluid inlet pipe leading into the chamber and a fluid outlet pipe leading out of the chamber;

b. positioned consecutively across the chamber, a counter electrode, a porous diaphragm and a working electrode, consisting essentially of charcoal cloth composed of activated fibrous or filamental carbon having a surface area, as measured by nitrogen adsorption by the method of Brunnauer/Emmett/Teller, of above 600 m$^2$ gm$^{-1}$;

c. means for applying a d.c. potential to the working electrode; and d. means for varying the potential applied to the working electrode.

10. An apparatus according to claim 9 wherein the means for applying a potential to the working electrode is selected from the group consisting of a metal wire and a metal gauze.

11. An apparatus according to claim 10 wherein the metal wire or metal gauze is pressed against the working electrode so that the potential applied to the working electrode is variable in increments of about 0.01 volts.

12. An apparatus according to claim 9 wherein the means for varying the potential applied to the working electrode is a potentiostat.

* * * * *